United States Patent Office 3,435,064
Patented Mar. 25, 1969

3,435,064
PROCESS TO CONVERT ACTIVATED METHYLENE GROUPS TO THE CORRESPONDING CARBONYL GROUPS
Edgar Schipper, Clifton, William Oroshnik, Plainfield, and Jerome M. Cinnamon, North Caldwell, N.J., assignors to Shulton, Inc., Clifton, N.J., a corporation of New Jersey
No Drawing. Filed June 30, 1965, Ser. No. 468,640
Int. Cl. C07c 69/76, 49/27
U.S. Cl. 260—469
10 Claims

ABSTRACT OF THE DISCLOSURE

A process is described for the oxidation of compounds containing activated methylene groups to convert the activated methylene group to the corresponding carbonyl group. In the process the compound is oxidized in a mixture of a dilower alkyl sulfoxide such as dimethyl sulfoxide and either hydrogen bromide or hydrogen chloride. The process is used to make 2-carboethoxy-1,3-benz-[f] indanedione, its sodium salt and other compounds which have utility as intermediates or constituents of sensitive coatings used in thermographic reproduction processes.

---

This invention relates to novel oxidation and reduction processes and, more particularly, it relates to processes for oxidizing compounds containing one or methylene groups as to form carbonyl compounds.

It is frequently desirable to oxidize certain portions of molecules of organic substances without substantially affecting other groups already contained in the substances. For example, 1,2,3-indanetrione-2-hydrate, or ninhydrin, is a constituent of the coating utilized to sensitize papers for use in the thermographic reproduction process. The thermographic reproduction process utilizes heat-sensitive papers for making copies of documents and the like. Where the areas of the coated paper are heated to an elevated temperature in the range of from about 50° C. to about 150° C. to correspond to lines on an original, a permanent color change is produced, so that a facsimile of the original is obtained.

Ninhydrin is a preferred keto compound which acts as a dye precursor with other materials coated on thermographic copy paper to produce the final image. Such methods as are available to synthesize this valuable compound are generally unsatisfactory. In the best known process for the preparation of ninhydrin, indane-1,3-dione is nitrated at the 2-position and the resulting nitro compound is then brominated and heated, for example in o-dichlor-benzene at about 180° C. whereupon it undergoes decomposition to give equal parts of the indane-1,2,3-trione and 2,2-dibromo-indane 1,2-dione. The trione on recrystallization from water forms the hydrated ninhydrin. The process is unsatisfactory for the reason that 50% of the initial indane-1,3-dione is converted to the dibromo compound. The theoretical yield therefore of ninhydrin is only 50% and the actual yield is considerably less than 50%.

This invention provides a process for the oxidation of activated lower alkyl and alkylene groups to produce carbonyl groups.

Briefly, the process of this invention permits the oxidation of activated methyl and methylene groups to carbonyl groups by treating a compound containing such methyl or methylene groups with a dilower alkyl sulfoxide in the presence of a halogen acid.

The oxidation reaction of this invention is preferably carried out with a methyl or methylene group as the activated alkyl or alkylene group. For convenience herein, such activated groups will be referred to as activated methylene groups, the methyl group being regarded as a methylene group where one position is occupied by a hydrogen atom. As used herein, "activated" is taken to mean that the methylene group has a significantly electropositive polarity. This activation is caused by the presence of an electrophilic group adjacent to the methylene group. The strongest activation is caused by the presence of one or two electrophilic groups immediately adjacent to the methylene group. Examples of such electrophilic groups are the nitro, aza, cyano, carbonyl, carbamido, carboalkoxy, aryl, carboxyl groups, and the like. Such electrophilic groups are considered to be activating for purposes of this invention. Activated methylene groups are more acidic than non-activated groups and form anions more readily.

The compound containing the activated methylene group is treated with a dialkyl sulfoxide in the presence of a hydrogen halide. The alkyl groups of the dialkyl sulfoxide suitably contain up to four carbon atoms per alkyl group. While the alkyl groups can be the same or different, dialkyl sulfoxides in which both alkyl groups are the same are generally preferable because of their economy. In practical reactions utilizing the process of this invention, dimethyl sulfoxide is especially preferred because it is more readily available.

At least a molar excess of dialkyl sulfoxide based on the moles of activated, oxidizable methylene groups is used in the process of this invention. More particularly, it is preferred to use a molar excess of from about 3 to about 8 moles, and preferably about 3–5 moles, of the sulfoxide for each oxidizable methylene group. For example, if 1,3-indanedione is to be reacted to produce the 1,2,3-trione-hydrate or if α-picoline is to be oxidized to 2-pyridinecarboxaldehyde, from about 3 to about 8 moles of the sulfoxide would be used for each mole of the dione or picoline, respectively. The preferred amounts are those which give the greatest economy in addition to high yields, and larger quantities of sulfoxide may be employed if desired.

The preferred halogen acids used in the process of this invention are hydrogen halides such as hydrogen bromide and hydrogen chloride. In one aspect of this invention, they are preferably added in anhydrous form to the reaction mixture containing the sulfoxide and the compound to be oxidized. Aqueous halogen acids may also be employed, preferably as concentrated aqueous solutions. For better yields and a generally more satisfactory process, hydrogen bromide is the preferred halide for use in the practice of this invention.

Generally, it has been found that considerably less hydrogen halide than dialkyl sulfoxide is required. Preferably, from about 0.05 to about 0.5 mole of hydrogen halide is sufficient for each mole of activated methylene to be oxidized, and in preferred embodiments, an amount of hydrogen halide ranging from about 0.1 to about 0.25 mole per mole of activated hydrocarbon may be sufficient. Despite the relatively low proportions of dialkyl sulfoxide and hydrogen halide, yields on the order of about 70% and more are customarily obtained. The preferred amount of halogen acid is dictated primarily by economic considerations. Considerably greater quantities, e.g., up to 5 moles or more of halogen acid per mole of active methylene may be employed. Further, if the sulfoxide is completely removed after the reaction, for example by distillation at 1–5 mm. Hg pressure, the yield may reach 95% and more. Unless otherwise indicated, all parts, proportions, and percentages herein are by weight.

If desired, other materials can be present in the reaction mixture. More particularly, a solvent or vehicle can be used in addition to the sulfoxide. It will be understood that where a solvent or other material is used, it should be inert to the methylene-containing material, the sulfoxide, and the hydrogen halide, and further should not enter into any reaction under the conditions of the treatment. Generally, the solvent is a halogenated hydrocarbon. Especially preferred are lower alkyl halogenated hydrocarbons, such as chloroform, carbon tetrachloride, and the like. Since the sulfoxides themselves are excellent solvents for many organic materials, it is preferred to use the sulfoxide alone without any additional solvent or other material.

This reaction can be carried out over a wide temperature range. At low temperatures the reaction proceeds slowly, and at very low temperatures the reaction mixture may solidify; while at greatly elevated temperatures the reactants tend to boil off. This latter problem can be corrected or obviated by performing the reaction under superatmospheric pressures up to the temperatures at which the reactants begin to decompose. For simplicity of operation, the reaction is preferably carried out at normal ambient atmospheric pressure. The best balance between speed of reaction, freedom from side reactions, and ease of handling is obtained in the preferred temperature range of from about 25° to about 100° C.

In preferred embodiments, the activated methylene-containing material is dissolved in the sulfoxide, and the hydrogen halide is added to the solution. The reaction is exothermic, and the temperature will spontaneously increase to about 35–45° C. during the addition of the hydrogen halide. The hydrogen halide addition preferably takes place over a period of from about 2 to about 3 hours. At the end of this period the reaction mixture is preferably heated to an elevated temperature at the range of from about 70° to about 95° C. and held at this temperature for an additional 1 to 2 hours in some embodiments of the invention.

At the end of the reaction period the sulfoxide is removed from the reaction mixture, preferably together with any dialkyl sulfide formed. The method of removal of the sulfoxide is not critical. It is preferably evaporated from the reaction mixture by heating and most preferably by steam distilling. With some reactants, there may be a possibility of an explosion if the sulfoxide is evaporated at atmospheric pressure, and accordingly, it is preferred in such instances that the sulfoxide be removed under subatmospheric pressures. A preferred pressure for the removal of sulfoxide is on the order of from about 1 to about 5 mm. Hg.

The reaction product can be readily recovered by conventional means. Ofter a molecular complex forms between the reaction product and the excess sulfoxide. This product is readily decomposed by digesting with hot water, preferably in the presence of a small amount of mineral acid. This is conveniently accomplished by digesting the product with boiling water with or without mineral acid for from about one to two hours utilizing about 100 ml. of water for each 10 g. of original reaction mixture. The digestion is preferably accomplished as a part of a steam distillation procedure which is continued until substantially all of the excess sulfoxide and any dialkyl sulfide which forms is distilled over. The mixture containing the product may be decolorized with charcoal, which is removed by filtration. The filtrate is cooled to crystallize the product. This process is especially suitable with products which are soluble in hot water. If desired the filtrate can be further purified by extraction of impurities with an organic solvent such as benzene or toluene subsequent to decolorization and before crystallization.

Where ninhydrin is produced, the product is found to crystallize adequately from the aqueous medium at a temperature on the order of about 5° C. The reaction product is generally about 92–97% pure and can further be purified by conventional techniques such as recrystallization. In the case of ninhydrin production, it is preferred further to purify the material by recrystallization from benzene containing up to about 3% water. The water in the benzene serves in this preferred embodiment to prevent dehydration of the ninhydrin to the trione. In preferred embodiments of this invention the yield of product will vary according to the specific reaction mixture, the product sought, and the quantities and proportions of reactants.

It is a particular feature of the invention that it provides a highly convenient means for producing hydrindantin. Hydrindantin is prepared by reacting the ninhydrin prepared in accordance with this invention with hypophosphorus acid. The ninhydrin need not be purified prior to the reaction but may be employed as prepared and recovered in aqueous solution without crystallizing it. The hypophosphorus acid may be generated in situ by adding a salt thereof to the aqueous solution of ninhydrin, which will typically have a pH of about 1–4.

In preferred embodiments of this invention the hypophosphorous acid is added in the form of alkali-metal and/or ammonium hypophosphites. Preferred hypophosphites are the sodium and potassium salts. The hypophosphite can be added, preferably in small increments, as a solid material to the aqueous solution containing the ninhydrin and it is especially preferred to add the hypophosphite in the form of a solution of the salt. Typically, the amount of hypophosphite employed will be about 0.5–1 mole per mole of ninhydrin.

The in situ reduction can be carried out over a wide temperature range. It is preferred to carry out the reduction at temperatures of from about 40° to about 80° C. for 30 minutes to 8 hours. At lower temperatures the reaction rate is very slow, and at higher temperatures the reaction is more difficult to control and may produce unwanted by-products. For best results, it is preferred to heat the reduction reaction mixture to a temperature in the range of from about 40° to about 60° C. on a steam bath, although somewhat higher temperatures can also be used.

The following examples are given to illustrate some embodiments of this invention, but they do not define the entire scope of the invention.

Example I

A 6.5 g. (0.08 mole) quantity of gaseous anhydrous hydrogen bromide is added to a continuously stirred solution of 10 g. (0.068 mole) of 1,3-indanedione in 100 ml. (110 g., 1.41 moles) of dimethyl sulfoxide. The gaseous hydrogen bromide is added at a rate to keep the temperature below 45° C. The mixture is stirred at room temperature for one hour and at 70° C. for one hour.

The reaction mixture is vacuum-distilled at a pressure of 1 mm. Hg until all of the dimethyl sulfide and dimethyl sulfoxide is removed. The residue is then taken up in 150 ml. of water containing 3 ml. of concentrated hydrochloric acid, and the mixture is heated on a steam bath for one hour. Charcoal is slurried with the reaction mixture to decolorize it, and the mixture is filtered.

The filtrate is concentrated to one-third of its original volume and the concentrate maintained overnight in a refrigerator. Crystals of ninhydrin with a melting point of 240–242° C. are filtered off and obtained in a yield of 69%.

Example II

A 0.9 g. (0.25 mole) quantity of gaseous anhydrous hydrogen chloride is added to a continuously stirred solution of 10 g. (0.068 mole) of 1,3-indanedione in 100 ml. (110 g., 1.41 moles) dimethyl sulfoxide. The gaseous hydrogen chloride is added at a rate so as to keep the temperature below about 45° C. The mixture is stirred at room temperature for one hour and then at 70° C. for one hour.

The dimethyl sulfoxide and dimethyl sulfide are removed, and the product is recrystallized, decolorized, and crystallized as in Example I. Crystals of ninhydrin with a melting point of 240–242° C. are obtained by filtration in a yield of 18%.

Example III

An 8.4 g. quantity of 48% aqueous hydrobromic acid (0.05 mole HBr) is added with constant stirring to a solution of 10 g. (0.068 mole) of 1,3-indanedione in 100 ml. (110 g., 1.41 moles) dimethyl sulfoxide. The hydrogen bromide solution is added at a rate to keep the temperature below 45° C. The mixture is stirred at room temperature for one hour and then at 70° C. for one hour.

The dimethyl sulfoxide and dimethyl sulfide are removed and the product is recovered as in Example I. Crystals of ninhydrin with a melting point of 240–242° C. are filtered off in a yield of 65%.

Example IV

A 1.5 g. (0.019 mole) quantity of anhydrous hydrogen bromide is added to a continuously stirred solution of 10 g. (0.068 mole) of 1,3-indanedione in 19.4 ml. (21.3 g., 0.27 mole) dimethyl sulfoxide. The mixture is kept at room temperature for two hours and then refluxed at 50–70° C. for two hours.

Water in the amount of 150 ml. containing 3 ml. of concentrated hydrochloric acid is added to the reaction mixture, and the mixture is then steam-distilled until all the dimethyl sulfide and dimethyl sulfoxide have been removed. The residual solution is slurried with charcoal and filtered.

The filtrate is concentrated to one-third of its original volume and the concentrate is maintained overnight in a refrigerator. Crystals of ninhydrin with a melting point of 240–242° C. are filtered off in a 75% yield.

Example V

A 1.5 g. (0.019 mole) quantity of anhydrous hydrogen bromide is added to a continuously stirred solution of 10 g. (0.068 mole) of 1,3-indanedione in 19.4 ml. (21.3 g., 0.27 mole) dimethyl sulfoxide and 50 ml. of chloroform as a diluent or co-solvent. The mixture is kept at room temperature for two hours and then refluxed for two hours.

The dimethyl sulfoxide, dimethyl sulfide and solvent are removed and the product is recovered as in Example I to obtain ninhydrin with a melting point of 240–242° C.

Example VI

A 1.5 g. (0.019 mol) quantity of anhydrous hydrogen bromide is added with continuous stirring to a solution of 10 g. (0.068 mole) of 1,3-indanedione in 19.4 ml. (21.3 g., 0.27 mole) of dimethyl sulfoxide. The mixture is kept at room temperature for two hours and then refluxed for two hours at a temperature of 50–70° C.

A 150 ml. quantity of water containing 3 ml. of concentrated hydrochloric acid is added to the reaction mixture and the mixture is steam-distilled until all the dimethyl sulfide and dimethyl sulfoxide have been removed. The residual solution is slurried with charcoal and filtered.

To the ninhydrin-containing aqueous filtrate is added a solution of 3 g. of sodium hypophosphite, and 20 ml. of water. The mixture is heated on a steam bath for one hour, and after cooling to room temperature, the resulting suspension is filtered. The precipitate is air-dried and decolorized by slurrying with 100 ml. of hot, dry ethyl acetate. Hydrindantin with a melting point of 250–252° C. is obtained in 75% yield based on indanedione.

Alternatively, the procedure of this example can be used to produce hydrindantin by heating the ninhydrin-containing filtrate to 60° C. and adding small quantities of solid hypophosphite.

The product of the reduction reaction may contain small amounts of colored impurities. These can be removed by extraction with a suitable solvent. For example, the reduction reaction in aqueous solution may be conducted in the presence of an equal volume of an inert extracting solvent such as benzene. Alternatively, the reduction reaction product may be extracted with small portions of a suitable solvent, say toluene, which is preferably heated. When this latter technique is employed, the amount of extracting solvent employed may typically be about 20% of the volume of the aqueous solution.

Example VII 1,3-indanedione and dimethyl sulfoxide are reacted and refluxed as in Example IV. After cooling, the suspension is filtered and the resulting solid with a melting point of 82–84° C., analyzing as a 1:1 adduct of ninhydrin-dimethyl sulfoxide, is dissolved in 150 ml. of water containing 3 ml. of concentrated hydrochloric acid.

The solution is heated on a steam bath for one hour, slurried with charcoal, and filtered. The filtrate is concentrated to one-third of its volume and the concentrate is maintained overnight in a refrigerator. The ninhydrin crystals are obtained in a yield of 55%.

Alternatively, the procedure of this example can be varied by diluting the suspension after cooling with 50 ml. of toluene prior to filtration. This leads to a cleaner end-product, but decreases the yield to about 45%.

Example VIII

A 1.5 g. (0.019 mole) quantity of anhydrous hydrogen bromide is added to a continuously stirred solution of 10 g. (0.068 mole) of 1,3-indanedione in 19.4 ml. (21.3 g., 0.27 mole) dimethyl sulfoxide. The mixture is kept at room temperature for two hours and then refluxed at a temperature of 50–70° C. for two hours. The resulting dimethyl sulfide is distilled off at atmospheric pressures, while maintaining the temperature of the reaction mixture not in excess of 70° C.

Water in the amount of 150 ml. containing 3 ml. of concentrated hydrochloric acid is added, and the reaction mixture is steam-distilled until all the dimethyl sulfide and dimethyl sulfoxide are removed. The remaining solution is slurried with charcoal and filtered. The filtrate is extracted with 100 ml. of hot toluene further to decolorize the product.

The washed aqueous layer is concentrated to one-third of its original volume and the concentrate is maintained overnight in a refrigerator. Crystals of ninhydrin with a melting point of 240–242° C. are filtered off in a yield of 50%.

Example IX

The procedure of Example VII is repeated, but the washed aqueous layer after treatment with toluene is not concentrated and crystallized. Instead, a solution of 3 g. of sodium hypophosphite and 20 ml. of water is added to the washed toluene layer. The mixture is heated on a steam bath for one hour, cooled to room temperature, and the resulting suspension is filtered. The precipitate is air-dried and decolorized by slurrying with 100 ml. of dry ethyl acetate.

Hydrindantin with a melting point of 250–252° C. is obtained in a yield of 70%.

Example X

One part of anhydrous hydrogen bromide is added to a continuously stirred solution of two parts of diphenylmethane in eight parts of dimethyl sulfoxide. This corresponds to a mole ratio of 1:1:8.6 for hydrogen bromide: diphenylmethane:dimethylsulfoxide. The reaction mixture is stirred at a room temperature for one hour and heated to 80° C. for four hours. The solution, which separates into two layers, is vacuum-distilled at a pressure of 2 mm. Hg, and the residue is dissolved in 100 ml. of water.

The resulting solution is heated on a steam bath for two hours and then extracted with diethyl ether. The ether extract is dried, and the ether is removed to yield a residue which on treatment with 2,4-dinitrophenylhydrazine yields benzophenone-2,4-dinitrophenylhydrazone with a melting point of 236–237° C.

Example XI

One part of anhydrous hydrogen bromide is added to a continuously stirred solution of two parts of acetophenone in eight parts of dimethyl sulfoxide. This corresponds to a mole ratio of 0.745:1:6.2 for hydrogen bromide:acetophenone:dimethyl sulfoxide. The reaction mixture is kept at room temperature for 2.5 hours and heated to 90° C. for two hours. Excess dimethyl sulfoxide and dimethyl sulfide are removed by vacuum distillation. The residue is diluted with 150 ml. of water, and the aqueous suspension so obtained is heated on a steam bath for one hour. The suspension is extracted with ethyl acetate, and the extract is dried and distilled.

The fraction with a boiling point of 81–83° C. (at 1 mm. Hg) is collected and converted to a crude solid phenylglyoxal hydrate by heating on a steam bath for four hours with 150 ml. of water. For purposes of positive identification the solid is refluxed briefly with an ethanolic solution of o-phenylenediamine. Dilution of the reaction mixture with water yields 2-phenylquinoxaline with a melting point of 76–77° C.

Example XII

An 89.1 g. (1.1 mole) quantity of anhydrous hydrogen bromide is added to a continuously stirred solution of 196.2 g. (1 mole) of desoxybenzoin and 285 ml. (4 moles) of dimethyl sulfoxide. The reaction is allowed to proceed at room temperature for one hour and at 95° C. for four hours while the dimethyl sulfide formed is continuously removed by distillation.

The solid residue is recrystallized from ethanol. The resulting benzil is obtained in 90% yield and melts at 94–95° C.

Example XIII

An 89.1 g. (1.1 mole) quantity of anhydrous hydrogen bromide is added with continuous stirring to a solution of 224.2 g. (1 mole) of dibenzoylmethane in 285 ml. (4 moles) of dimethyl sulfoxide. The reaction mixture is heated for one hour at 95° C. while the by-product dimethyl sulfide is removed by distillation. The resulting suspension is filtered and the solid is taken up in ligroin. The ligroin-insoluble material is filtered off and the filtrate is treated with water containing several drops of acetic acid.

The mixture is stirred and heated for one hour on a steam bath. After removal of the ligroin under reduced pressure, a colorless solid, the hydrate of 1,3-diphenyl-propanetrione, with a melting point of 93–95° C. precipitates and is filtered off. This trione is dissolved in ligroin and the colorless solution is heated on a steam bath until its color changes to a golden yellow. After concentration and cooling of the solution, 1,3-diphenylpropanetrione crystallizes out as yellow needles with a melting point of 67–69° C.

Example XIV

A 33.4 g. (0.4 mole) quantity of anhydrous hydrogen bromide is added to a continuously stirred solution of 174.1 g. (1 mole) of α-picoline hydrobromide in 285 ml. (4 moles) of dimethyl sulfoxide. After the reaction mixture is stirred for two hours at room temperature, it is heated for three hours at 90° C. and the dimethyl sulfide is allowed to distill off. The residual material is vacuum distilled and the fraction with a boiling point of 55–80° C. (at 14 mm. Hg) is collected.

For purposes of identification the distillate is reacted with 2,4-dinitrophenylhydrazine. The resulting solid is identified as the 2,4 - dinitrophenylhydrazone of 2 - pyridinecarboxaldehyde with a melting point of 260° C.

Example XV

One gram (0.012 mole) of anhydrous hydrogen bromide is added to a stirred mixture of 7.85 grams (0.04 mole) of peri - 1,3 - naphthidenedione and 28.4 ml. (0.40 mole) of dimethyl sulfoxide. The temperature rises rapidly from 26° to 44°. The mixture is heated gradually to 88° at which point dimethyl sulfide begins to distill. The heating is continued for 30 minutes until the theoretical amount of dimethyl sulfide is collected (6 ml.). The excess dimethyl sulfoxide is distilled off under vacuum—B.P. 55–70°/0.3 mm. The residue is treated with 10 ml. of concentrated hydrochloric acid in 100 ml. of water, heated on the steam bath for one hour and filtered hot. The product separates on cooling as an orange solid. Three and one half grams (38.4% yield) are collected. The 1,2,3 - naphthidenetrione is recrystallized from water as orange platelets, M.P. 267–270°.

Example XVI

A 1.5 g. (0.019 mole) quantity of anhydrous hydrogen bromide is added to a continuously stirred solution of 10 g. (0.068 mole) of 1,3 - indanedione in 44 g. (0.27 mole) of dibutyl sulfoxide. The mixture is kept at room temperature for two hours and then refluxed at 50–70° C. for two hours.

Water in the amount of 150 ml. containing 3 ml. of concentrated hydrochloric acid is added to the reaction mixture, and the mixture is then steam-distilled until all the dibutyl sulfide and dibutyl sulfoxide have been removed. The residual solution is slurried with charcoal and filtered.

The filtrate is concentrated to one-third of its original volume and the concentrate is maintained overnight in a refrigerator. Crystals of ninhydrin with a melting point of 240–242° C. are filtered off.

Example XVII

A 1.5 g. (0.019 mole) quantity of anhydrous hydrogen bromide is added with continuous stirring to a solution of 10 g. (0.068 mole) of 1,3 - indanedione in 44 g. (0.27 mole) of dibutyl sulfoxide. The mixture is kept at room temperature for two hours and then refluxed for two hours at a temperature of 50–70° C.

A 150 ml. quantity of water containing 3 ml. of concentrated hydrochloric acid is added to the reaction mixture and the mixture is steam-distilled until all the dibutyl sulfide and dibutyl sulfoxide have been removed. The residual solution is slurried with charcoal and filtered.

To the ninhydrin-containing aqueous filtrate is added a solution of 3 g. of sodium hypophosphite, and 20 ml. of water. The mixture is heated on a steam bath for one hour, and after cooling to room temperature, the resulting suspension is filtered. The precipitate is air-dried and decolorized by slurrying with 100 ml. of hot, dry ethyl acetate. Hydrindantin with a melting point of 250–252° C. is obtained.

Example XVIII

This example illustrates the use of the process of this invention to prepare a novel compound, 1,2,3-benz-[f] indanetrione and the hydrate thereof.

A mixture of 2,3 - diethyl naphthalate (27.2 g., 0.1 mole) and sodium sand (4.6 g., 0.2 mole) is heated to 85° C. and ethyl acetate (22.6 g., 0.256 mole) is added thereto dropwise over a period of one hour. The reddish-brown mixture is stirred for six hours at 85° C. and allowed to stand overnight. A small quantity (10 ml.) of ethyl acetate is added and the mixture is heated to 80° for two hours to react unreacted sodium particles. The reaction mixture is cooled to room temperature and diluted with 50 ml. of absolute ether. The solid present is filtered off, washed with ether, and dried in vacuo to give 20 g. (69% of theory) of light brown 2-carboethoxy - 1,3 - benz - [f] indanedione, sodium salt. This previously unknown compound is used as follows.

A quantity of 10 g. (0.0344 mole) of the sodium salt is suspended in 100 ml. of water and the suspension is acidified, while stirring, with dilute hydrochloric acid. The resultant solid is filtered off, washed with dilute hydrochloric acid, and air-dried to give 8.4 g. (91%) of yellow 2 - carboethoxy - 1,3 - benz - [f] indanedione having a melting point of 155–160° C. Analysis shows 71.78% carbon (theory 71.63%) and 4.48% hydrogen theory 4.51%). This novel compound is further used as follows.

A quantity of 5.8 g. (0.0218 mole) of the 2-carboethoxy - 1,3 - benz - [f] indanedione is boiled for 3 minutes in 100 ml. of glacial acetic acid and filtrated hot.

The filtrate is allowed to cool and crystallize overnight. The crystals obtained are filtered off, washed with cold glacial acetic acid, and air-dried to give 2.2 g. (51.9%) of brown 1,3 - benz - [f] indanedione which melts with decomposition at 225–227° C. A sample of this product, recrystallized from ethanol, gives an analysis of 79.61% carbon (theory 79.58%) and 4.33% hydrogen (theory 4.11%). The novel 1,3 - benz - [f] indanedione is further used as follows to prepare the novel 1,2,3 - trione compound.

A mixture of 1.96 g. (0.01 mole) of 1,3 - benz-[f] indanedione and 7.8 g. (0.10 mole) dimethyl sulfoxide is prepared. Anhydrous hydrogen bromide in the amount of 0.5 g. (0.0056 mole) is added rapidly and the temperature rose to 38° C. The mixture is heated to 85–88° C. and maintained at that temperature, with stirring, for one hour. The dimethyl sulfide which forms is collected in a Dean-Stark trap. At the end of the reaction, 1.6 ml. (0.02 mole) of dimethyl sulfide is collected. The remaining dimethyl sulfoxide is stirpped off at 80° C. and 0.1 mm. The residue is digested on a steam bath for one hour with 50 ml. of dilute hydrochloric acid. A total of 2.0 g. (87.8%) of crude 1,2,3 - benz-[f] indanetrione is recovered. The hydrate is obtained by recrystallizing from water to give pale orange crystals having a melting point of 297–300° C. Recrystallization from benzene gives yellow-brown crystals having a melting point of 296–298° C. Upon dehydration, the color of the compound changes to green.

The novel compound 1,2,3 - benz - [f] indanetrione may be used as an intermediate or as a constituent of sensitive coatings for use in thermographic reproduction processes.

What is claimed is:

1. An oxidation process which comprises reacting a compound having an activated methylene group with at least a molar excess of a dialkyl sulfoxide containing up to four carbon atoms in each alkyl group in the presence of a halogen acid selected from the group consisting of hydrogen bromide and hydrogen chloride to oxidize the methylene group to the corresponding carbonyl group.

2. The process of claim 1 wherein said activated methylene group is the activated methylene group of 1,3-indanedione, diphenylmethane, acetophenone, desoxybenzoin, dibenzoylmethane, picoline or 1,3-naphthidenedione.

3. An oxidation process which comprises reacting a compound having an activated methylene group with at least a molar excess of a dialkyl sulfoxide containing up to four carbon atoms per alkyl group at a temperature of from about 25° C. to about 100° C. in the presence of a halogen acid selected from the group consisting of hydrogen bromide and hydrogen chloride to oxidize the methylene group to the corresponding carbonyl group.

4. An oxidation process which comprises reacting a compound having an activated methylene group with dimethyl sulfoxide at a temperature of from about 25° C. to about 100° C. in the presence of a halogen acid selected from the group consisting of hydrogen bromide and hydrogen chloride to oxidize the methylene group to the corresponding carbonyl group, the amount of sulfoxide being from about 3 to about 8 moles of sulfoxide per mole of activated methylene group and the amount of halogen acid being from about 0.05 to about 0.5 mole of halogen acid per mole of activated methylene group.

5. An oxidation process which comprises reacting a compound containing an activated methylene group with a dialkyl sulfoxide containing up to four carbon atoms per alkyl group at a temperature of from about 25° C. to about 100° C. in the presence of halogen acid selected from the group consisting of hydrogen bromide and hydrogen chloride to oxide the methylene group to the corresponding carbonyl group, the amount of sulfoxide being from about 3 to about 8 moles of sulfoxide per mole of activated methylene group and the amount of halogen acid being from about 0.05 to about 0.5 mole of halogen acid per mole of methylene group.

6. An oxidation process which comprises reacting 1,3-indanedione with at least a molar excess of a dilower alkyl sulfoxide containing up to four carbon atoms per alkyl group at a temperature of from about 25° C. to about 100° C. in the presence of a halogen acid selected from the group consisting of hydrogen bromide and hydrogen chloride to produce ninhydrin.

7. An oxidation process which comprises reacting 1,3-indanedione with at least a molar excess of a dialkyl sulfoxide containing up to four carbon atoms per alkyl group at a temperature of from about 25° to about 90° C. in the presence of a halogen acid selected from the group consisting of hydrogen bromide and hydrogen chloride to produce ninhydrin.

8. An oxidation process which comprises reacting 1,3-indanedione with from about 3 to about 8 moles of dimethyl sulfoxide per mole of dione at a temperature of from about 25° C. to about 100° C. in the presence of from about 0.05 to about 0.5 mole of a halogen acid selected from the group consisting of hydrogen bromide and hydrogen chloride per mole of dione to produce ninhydrin.

9. The sodium salt of 2-carboethoxy-1,3-benz-[f] indanedione.

10. 2-carboethoxy-1,3-benz-[f] indanedione.

References Cited

Migrdichian, Orangic Synthesis, vol. I, Reinhold Publishing, N.Y., 1957, pp. 141–142. QD262 M55.

Mandloi, Chem. Abstracts, 54, p. 12074c, 1960. QD1A51.

Meier et al., Chem. Berichte, 90, pp. 222–227, 1957. QD1D4.

Kornblum et al., J. Am. Chem. Soc., 79, p. 6562, 1957. QD1A5.

JAMES A. PATTEN, *Primary Examiner.*

E. J. GLEIMAN, *Assistant Examiner.*

U.S. Cl. X.R.

260—566, 250, 296, 297, 590, 591, 592; 117—36.8